United States Patent [19]

Frank, Jr.

[11] Patent Number: 4,939,821
[45] Date of Patent: Jul. 10, 1990

[54] DROP WIRE CLAMP ASSEMBLY

[76] Inventor: George J. Frank, Jr., 664 Thompson Cir., Inverness, Ill.

[21] Appl. No.: 308,184

[22] Filed: Feb. 9, 1989

[51] Int. Cl.$^5$ .............................................. F16G 11/04
[52] U.S. Cl. .................. 24/136 R; 24/115 M; 403/314
[58] Field of Search ........................ 24/136 R, 115 M; 403/211, 314, 374, 409.1

[56] References Cited

U.S. PATENT DOCUMENTS

| | | | |
|---|---|---|---|
| 2,076,359 | 4/1937 | Bay ................................... | 24/136 R |
| 3,629,909 | 12/1971 | Riley. | |
| 4,407,471 | 10/1983 | Wilmsmann et al. ........ | 24/136 R X |
| 4,637,098 | 1/1987 | Okena ................................ | 24/136 R |

FOREIGN PATENT DOCUMENTS 460649 10/1949 Canada .............................. 24/136 R

OTHER PUBLICATIONS

Senior Industries, Inc. Product Specification Sheet "Drop Wire Clamp".

Primary Examiner—Laurie K. Cranmer
Attorney, Agent, or Firm—Jenner & Block

[57] ABSTRACT

A drop wire clamp assembly sandwiches an insulated drop wire between a housing bail and an elongated pressure pad which is pressed by a slide wedge assembly against the pad. The pressure pad has a side tab which extends into a capturing aperture in the wall of the housing to guide the pressure pad for movement along the height of the side wall of the housing, and allows tilting motion thereof, without allowing the pad to drop out of an open channel formed in the housing bail.

10 Claims, 1 Drawing Sheet

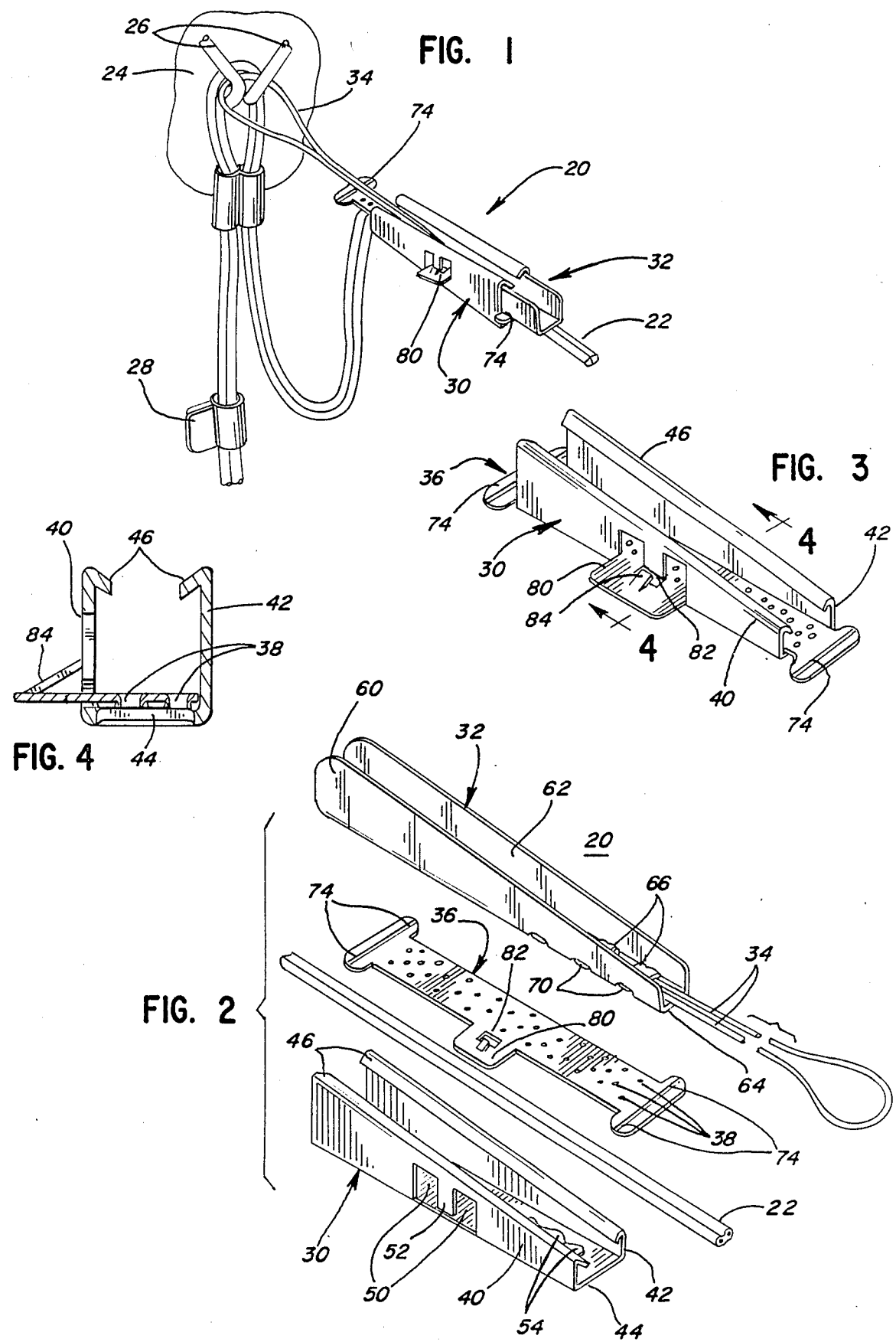

DROP WIRE CLAMP ASSEMBLY

BACKGROUND OF THE INVENTION

This invention relates to a drop wire clamp assembly which is used to support an insulated drop wire relative to a structure such as a pole or building.

Typically, a drop wire clamp assembly is used to support an insulated telephone cable which is strung between a pole and a building. The drop wire clamp assembly has a wire loop which attach to the structure so as to take the strain off of the connection where the telephone line reaches the building or telephone pole. The clamp assembly should firmly grip and hold the drop wire even under maximum tension. However, the grip must be made without breaking or cutting the insulation, which would eventually cause failure of the telephone service.

A typical drop wire clamp assembly comprises a wedge shaped bail housing having a series of ridges, and a wedge slide which mates with the bail housing to locate the insulated telephone drop wire therebetween. The wedge slide has a wire loop extending therefrom for connection to the structure. The bail housing and wedge slide are often formed of stainless steel or other metal. A shim or pressure pad having a large number of perforations is located between the wedge slide and the insulated drop wire, and has retaining ears which prevent the shim from moving longitudinally. As the wedge slide is slid through the bail housing, the shim presses into the insulation of the telephone line to firmly grip and hold the telephone line.

While the above-described drop wire clamp assembly produces the desired result of firmly gripping drop wires even under maximum tension, and is relatively inexpensive to manufacture, it has a number of serious defects in practice. The line installer needs to place the telephone drop line within the bail housing, then place the shim over the line, and while holding together this structure, insert and pull the wedge slide into position. The wire loop is then connected onto a hook or other connection to the structure. In the process of performing all of these operations, the shim may fall out, or may not be properly oriented against the insulated telephone drop wire. The presence of the shim is a cause of many practical difficulties during installation. However, when the shim is omitted or drops out, gaps in the bottom surface of the wedge slide as it is pulled into the bail housing can cut into the insulated drop wire and create an undesirable break in the insulation.

Other types of drop wire clamp assemblies have been utilized over the years. For example, it has been known to provide an assembly in which the shim is eliminated by forming an insert with a pair of side walls with cast-in teeth which are deformable against the insulated wire to thereby clamp the drop wire. This type of assembly is not as convenient, and has not been accepted in the trade to the extent of the first mentioned drop wire clamp assembly.

SUMMARY OF THE INVENTION

In accordance with the present invention, an improved drop wire clamp assembly is provided which is economical to manufacture, easier to use in the field than prior assemblies, and eliminates the disadvantages with prior assemblies. The improved drop wire clamp assembly includes a retaining means which captures the shim to the housing in a manner to allow vertical and tilting motion so that the insulated drop wire can be located within the housing, be covered by the shim, and then engaged by sliding the slide assembly therein. However, the retaining means prevents the shim from falling out of the housing during the installation process.

The improved drop wire clamp assembly includes a tab on the shim which is insertable into a retaining aperture located within at least the side wall of the bail housing. The tab is snap fit into the retaining aperture and is movable along an extending guide post which allows proper movement of the shim relative to the housing during installation, yet retains the shim to the housing so that it cannot fall out of the housing. Since a line installer may be working at heights above the ground and needs to simultaneously perform several operations, the captured shim pad within the housing allows greatly simplified installation and ease of assembly. In effect, the captured shim pad and housing, and the slide assembly, form a two-piece assembly which reduces the number of critical parts which the installer must handle while making the installation.

One object of the present invention is to provide an improved drop wire clamp assembly in which a shim pad is captured to a bail housing to allow relatively free movement during installation while preventing inadvertent loss of the shim pad during the installation. This simplifies the installation in the field.

Another object of the present invention is to provide an improved drop wire clamp assembly in which a U-shaped bail housing includes a retaining aperture and guide surface. A shim pad which sandwiches an insulated drop wire between the pad and the housing includes a tab insertable into the retaining aperture and is movable along the guide surface in a direction transverse to the longitudinal extent of the clamp assembly while also being tiltable therein. This allows a relatively simple placement of the insulated drop wire within the housing and placement of the shim pad thereover, without inadvertent loss of the shim pad. These advantages are provided in an assembly which is economical to manufacture, simpler to install in the field, and produces equal or superior performance.

Other objects and advantages will be apparent upon the following detailed description with reference to the drawings. In the drawings, like reference numerals refer to like parts.

BRIEF DESCRIPTION OF THE DRAWINGS

FIG. 1 is a perspective view of the assembled drop wire clamp assembly supporting an insulated drop wire at the position where the drop wire is secured to a structure;

FIG. 2 is an exploded view of the drop wire clamp assembly of FIG. 1;

FIG. 3 a perspective view of the bail housing and shim pad when assembled together; and FIG. 4 an enlarged side sectional view of the bail housing and shim pad taken along lines 4—4 of FIG. 3.

DESCRIPTION OF THE PREFERRED EMBODIMENT

Referring to FIG. 1, a novel drop wire clamp assembly 20 is illustrated which secures and supports an insulated electrical line 22 relative to a structure 24 to which the line is being run. For example, the insulated electrical conductor 22 may be a telephone service drop wire being strung between a telephone pole and a building.

The structure 24 can be either the telephone pole or the building, and has a pair of hooks 26 secured to the structure. Telephone drop wire 22 is sandwiched within the assembly 20 which serves to take the tension off of the drop wire. The telephone wire itself is looped around the hooks 26 and then continues through a sleeve 28 to its destination. While the telephone drop wire 22 is shown as a pair of side-by-side multiple connectors surrounded by insulation, it can comprise a coaxial cable or any other form of electrical conductor(s) surrounded by insulation.

As seen in FIG. 2, the clamp assembly 20 consists of a bail housing 30 of wedge shape, a mating wedge slide assembly 32 which includes a wire loop 34 for securing the assembly to the supporting structure and a pressure pad or shim 36 having a large number of holes or perforations 38 located therein. The drop wire 22, as will appear, is sandwiched between the interior channel of the bail housing 30 and the shim pad 36.

Bail housing 30 consists of a U-shaped cross section of stainless steel having a pair of side walls 40, 42, and a center wall or base 44. The side walls 40, 42 extend along an longitudinal direction in a wedge shape. The top edges of the side walls 40, 42 are each bent inwardly to form a pair of tracks 46 for guiding the slide assembly as will appear. The clamp assembly, to the extent described to the present, is generally similar to prior drop wire clamp assemblies.

However, the present bail housing 30 also includes a retaining guide means in the form of an aperture 50, see FIG. 2, of generally U-shape and located in the side wall 40. The bottom of the U-shaped aperture extends above the base wall 44 by a distance only slightly greater than the thickness of the pressure pad 36. In effect, the U-shaped aperture 50 defines a center post 52 which extends downwardly from near the upper end of the track 46 to the corner between the side wall 40 and the bottom base wall 44. There is a slight gap between the post 52 and the base wall 44, which corresponds to the bottom of the U-shaped guide aperture 50.

Along the longitudinal extent of the center wall 44 are a series of corrugations or ridges 54 for better holding or gripping of the insulated drop wire 22 thereagainst as it is pressed against the center wall. While the ridges 54 provide some grip, as is conventional, they still allow the insulated drop wire 22 to slide longitudinally within the open channel of the bail housing 30.

The slide assembly 32, per se, is conventional and consists of a U-shaped cross section of stainless steel having a pair of side walls 60, 62 extending in a longitudinal direction in a wedge shape, and a center wall or base 64. The center base 64 is punched upwardly from the bottom surface to define a pair of hoops 66 into which are slid the ends of the wire loop 34. Hoops 66 are then crimped or staked in place so that the wire loop can withstand a considerable separation force, such as in excess of 500 pounds, without breaking, slipping or pulling out. The hoops 66 extend upwardly from open apertures 70 formed in the bottom surface of the center base of the U-shaped cross section, and thereby form the mounting means for the wire loop 34.

The pressure pad or shim 36 is preferably formed of stainless steel and terminates at each end in a pair of extending ears 74 with rounded corners. The ears 74 are located so as to capture the shim 36 within the open channel of the housing 30, see FIG. 3, so as to limit longitudinal motion of the shim within the housing. In addition, the rounded ears allow the installer to hold and tilt the pad within the open channel, as is per se, conventional. The perforations 38 are punched from the top and are simultaneously or later flattened from the bottom so that there are no jagged or sharp edges on the bottom of the perforations. Any forming operation which breaks all sharp corners and edges so that the bottom surface is relatively smooth, is acceptable for this purpose.

The pressure pad 36 also includes a retaining tab 80 extending outwardly from the center of the elongated base of the pad and in the same plane as the pad. Within the center of the tab 80 is a guide aperture 82 which is punched out or otherwise formed in the tab. A smaller tang or tab 84 is punched upwardly from the tab 80 so as to form a locking tang, as will appear, for the pressure pad.

In operation, the tab 80 is inserted into the retaining aperture 50 of the housing in order to capture the pressure pad relative to the housing. The tang 84 bends downwardly and snap fits through the gap between the guide post 52 and the housing wall 44, and then snaps back into place as seen in FIG. 3, in order to retain the pad and prevent the pad from dropping out of the open channel of the housing. The pad 36 can be moved up and down along the guide post 52, i.e. it moves transversely up and down relative to the axis of the open channel, along essentially the entire height of the side wall 40, from the bottom corner to near the top of the side wall. In addition, the aperture 82 allows the elongated pad 36 to be tilted within the open channel. In effect, the post 52 serves as a male member which interconnects with the female aperture 82 to lock together the parts.

When the assembly is to be utilized, it is preferable that the retaining tab 80 be inserted within the retaining aperture 50 of the housing so that the pad is captured slideably and tiltably relative to the housing. The line installer then grasps the ears 74 and tilts the pad 36 to the side of the channel so that the insulated drop wire 22 can be located against the ridges 54 on the bottom wall 44 of the housing. The pad 36 is lifted slightly in this process and placed over the insulated wire 22 so as to sandwich the wire between the pad 36 and the housing 30. The slide assembly 32 is then mateably interconnected with the housing 30 by placing the top wedge surfaces of the side walls 60, 62 under the guide tracks 46 and pulling the assembly to the right as illustrated in FIG. 2. The wedge-shaped side walls 60, 62 which engage the tracks 46 of the wedge-shaped housing 30 then cause the bottom surface of the slide assembly to move longitudinally to the right and, simultaneously, transversely downward against the shim 36. This motion firmly presses the pad 36 against the drop wire 22 and causes portions of the insulation of the drop wire to be pressed into the perforations 38, thus firmly retaining the drop wire within the clamp assembly. Once the drop wire has been firmly wedged within the assembly, the wire loop 34 is then ready to be hooked over the hooks 26 of the supporting structure 24 so as to complete the installation.

By placing the tab 80 within the capturing aperture 50 of the housing, the pressure pad shim and the housing become in effect one piece in the sense that the line installer does not have to be concerned with the shim dropping out of the open channel. Of course, the line installer could, if desired, keep the shim separate from the housing and, after placing the insulated drop wire 22 therein, insert the tab 80 into the capturing aperture so as to be snapped fit therein, after which the tab is rotated and lifted slightly to be place it against the drop wire.

Other modifications can be made within the spirit of the present invention. While the ears 74 on the pressure pad 36 allow the line installer to manipulate the shim from either end, it will be apparent that the function previously served by these end ears, namely retaining or capturing the shim longitudinally within the housing is no longer necessary because the retaining tab 80 serves this function as well as the additional function of capturing the shim to the housing to prevent the inadvertent loss of the shim. Thus, one or more of the ears 74 could be eliminated as desired. Other modifications will be apparent to those skilled in the art.

I claim:

1. A drop wire clamp assembly for supporting an insulated wire, comprising:
    a housing having a U-shaped cross section formed by a pair of side walls and a center wall, the side walls and center wall extending longitudinally to define an open channel for locating the insulated wire therein in abutment with the center wall, and an aperture formed in at least one of the walls,
    a separate elongated pad extendable along the length of the open channel and spaceable from the center wall to sandwich the insulated wire between the pad and the housing and having a tab extending outwardly from the pad and insertable into the aperture in the housing to thereby form a retaining means for releasably capturing the pad relative to the housing to prevent the pad from dropping out of the open channel while allowing motion transverse to the axis of the open channel and tiltable within the channel, said retaining means allowing the pad to be attached to and released from the housing, the tab on the elongated pad further includes a snap fit connector which expands to thereby retain the tab within the aperture of the housing, and
    a slide assembly having an elongated shape interconnectable with the housing for movement within the open channel to press the elongated pad against the insulated wire to firmly hold the insulated wire within the assembly.

2. A drop wire clamp assembly for supporting an insulated wire, comprising:
    a housing having a U-shaped cross section formed by a pair of side walls and a center wall, the side walls and center wall extending longitudinally to define an open channel for locating the insulated wire therein in abutment with the center wall, and an aperture formed in at least one of the walls which is U-shaped and defines a guide post formed in the wall of the housing,
    a separate elongated pad extendable along the length of the open channel and spaceable from the center wall to sandwich the insulated wire between the pad and the housing and having a tab extending outwardly from the pad and insertable into the aperture in the housing to thereby form a retaining means for releasably capturing the pad relative to the housing to prevent the pad from dropping out of the open channel while allowing motion transverse to the axis of the open channel and tiltable within the channel, said retaining means allowing the pad to be attached to and released from the housing, and the tab includes a second aperture captured by the guide post, and
    a slide assembly having an elongated shape inter-connectable with the housing for movement within the open channel to press the elongated pad against the insulated wire to firmly hold the insulated wire within the assembly.

3. The drop wire clamp assembly of claim 2 wherein the post is oriented transversely to the longitudinal extent of the open channel and extends generally along the height of the side wall, and the second aperture of the tab is mateably captured thereby and allows the tab to be moved along the height of the side wall.

4. The drop wire clamp assembly of claim 3 wherein the tab includes a tang extending upwardly with respect to the second aperture, said tang being yieldable as the tab is inserted within the first named aperture to form a snap fit connector for retaining the tab slideably along the post.

5. A drop wire clamp assembly for supporting an insulated wire, comprising:
    a housing having a U-shaped cross section formed by a pair of side walls and a center wall, the side walls and center wall extending longitudinally to define an open channel therebetween for locating the insulated wire in abutment with the center wall, and a retaining aperture located in at least one of the walls,
    a separate elongated pad extendable along the length of the open channel and spaceable from the center wall to sandwich the insulated wire therebetween,
    a tab extending from the pad and insertable into the retaining aperture to form a snap fit for capturing the pad relative to the housing, and
    a slide assembly having an elongated shape interconnectable with the housing for movement within the open channel to press the elongated pad against the insulated wire to thereby firmly hold the insulated wire within the assembly.

6. The drop wire clamp assembly of claim 5 wherein the retaining aperture is located in one of the pair of side walls and extends along the height of the side wall, and the tab being insertable into the retaining aperture for movement along the height of the side wall.

7. The drop wire clamp assembly of claim 5 wherein the retaining aperture is generally U-shaped and defines an extending post located in one of the walls, and the tab of the pad includes a second aperture formed within the tab, the tab being insertable into the first named aperture so that the post serves as a guide surface for the second named aperture.

8. The drop wire clamp assembly of claim 7 wherein the post extends downwardly from the top of the side wall to near the corner between the side wall and the center wall, and the tab being insertable into the housing at the location of the corner.

9. The drop wire clamp assembly of claim 5 wherein slide assembly has a U-shaped cross section formed by a pair of side walls and a center wall, the side walls and center wall extending longitudinally to form the elongated shape of the slide assembly, the U-shaped cross section of the slide assembly being mateably interconnectable with the U-shaped cross section of the housing to thereby slideably capture the housing and the slide assembly for longitudinal motion with respect thereto.

10. The drop wire clamp assembly of claim 9 wherein the top edges of the side walls of the housing are folded inwardly to form guide tracks, and the pair of side walls of the slide assembly are insertable under the guide tracks to force the bottom of the slide assembly against the elongated pad.

* * * * *

UNITED STATES PATENT AND TRADEMARK OFFICE
CERTIFICATE OF CORRECTION

PATENT NO. : 4,939,821

DATED : July 10, 1990

INVENTOR(S) : George J. Franks, Jr.

It is certified that error appears in the above-identified patent and that said Letters Patent is hereby corrected as shown below:

On the title page:

Item [76] should read --George J. Franks, Jr.--

Signed and Sealed this

Fifth Day of November, 1991

Attest:

HARRY F. MANBECK, JR.

*Attesting Officer*  *Commissioner of Patents and Trademarks*